United States Patent [19]

Manchester

[11] Patent Number: 4,945,893
[45] Date of Patent: Aug. 7, 1990

[54] FRYER FILTRATION SYSTEM

[75] Inventor: Robert A. Manchester, Manhattan Beach, Calif.

[73] Assignee: Welbilt Corporation, New Hyde Park, N.Y.

[21] Appl. No.: 193,938

[22] Filed: May 13, 1988

[51] Int. Cl.$^5$ ............................................. A47J 27/00
[52] U.S. Cl. ..................................... 126/391; 99/403; 99/408
[58] Field of Search ................... 126/391; 99/403, 408

[56] References Cited

U.S. PATENT DOCUMENTS

| | | | |
|---|---|---|---|
| 3,648,595 | 3/1972 | Morris | 99/408 |
| 3,707,907 | 1/1973 | Wilson et al. | 99/408 |
| 4,324,173 | 4/1982 | Moore et al. | 99/408 |
| 4,444,095 | 4/1984 | Anetsberger et al. | 99/408 |

OTHER PUBLICATIONS

Anets Food Preparation Systems brochure of "Fil-Tronic Self-Contained Filter System", May 1985.
Belshaw brochure of "Space Saver Electric Fryer Model 624", Nov. 1982.
Belshaw brochure of "Space Saver Fat Filter", Nov. 1982.
Anets Food Preparation Systems brochure of "Specialty Bakery Fryer", Aug. 1987.
Broaste/Alco brochure of "Model 1800G Solid State Control", Jan. 1988.
Pitco Frialator, Inc. brochure of "Donut Fryer Model 24-R-UFM", Aug. 1987.
Magnesol Food Service Products brochure of "Magnum Shortening Filter".
Blickman Equipment Corporation brochure of "Fry-Saver", Jun. 1986.

*Primary Examiner*—Henry A. Bennet
*Assistant Examiner*—Denise L. Ferensic
*Attorney, Agent, or Firm*—Spensley Horn Jubas & Lubitz

[57] ABSTRACT

A portable filtration system for a deep fat fryer capable of operation in a stationary mode in which the filtration process is conducted internally within the fryer. The filtration system may alternatively be operated in a portable mode in which an external wand is used to return the filtered oil to the fryer or other vessel such as a disposal vessel.

6 Claims, 4 Drawing Sheets

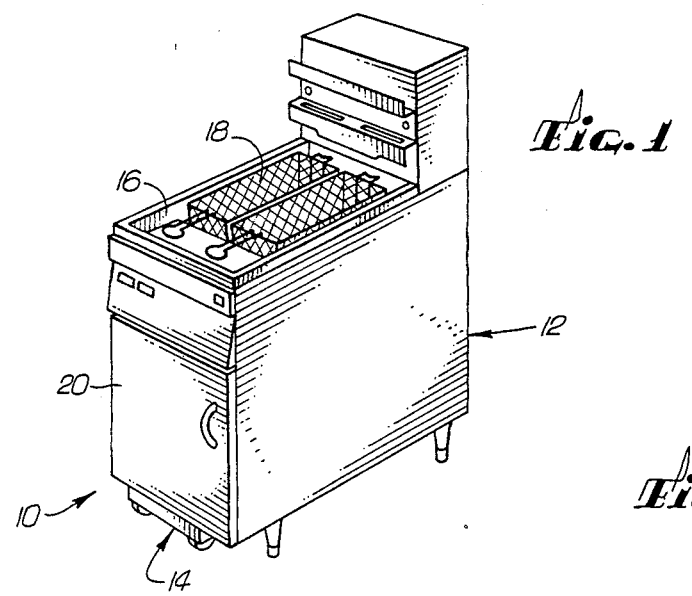
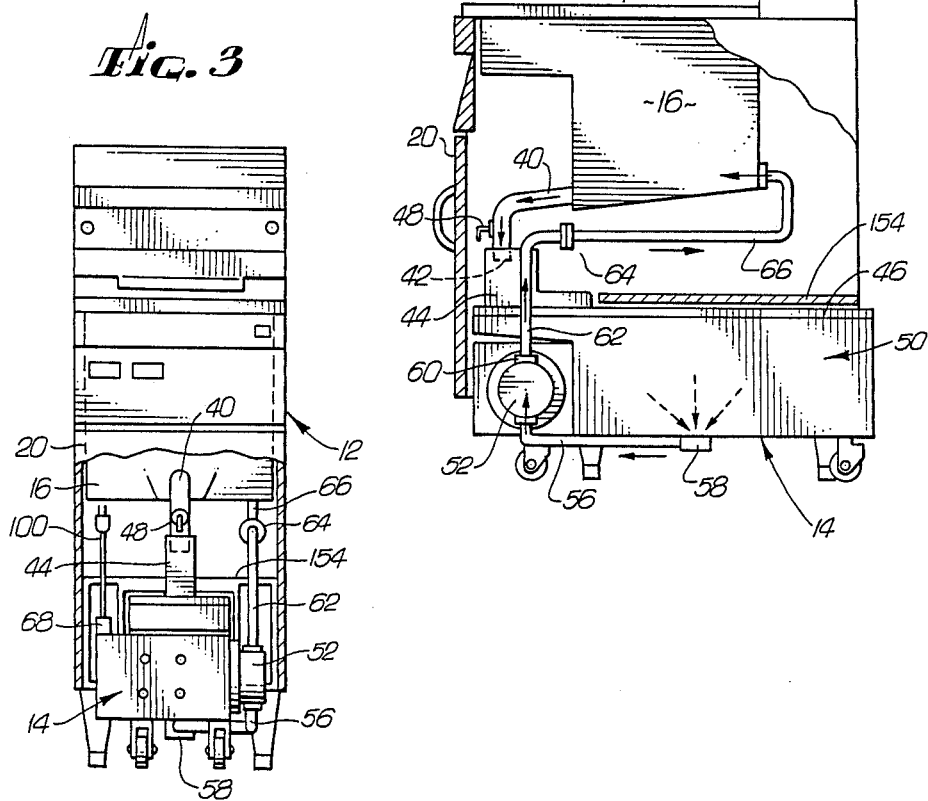

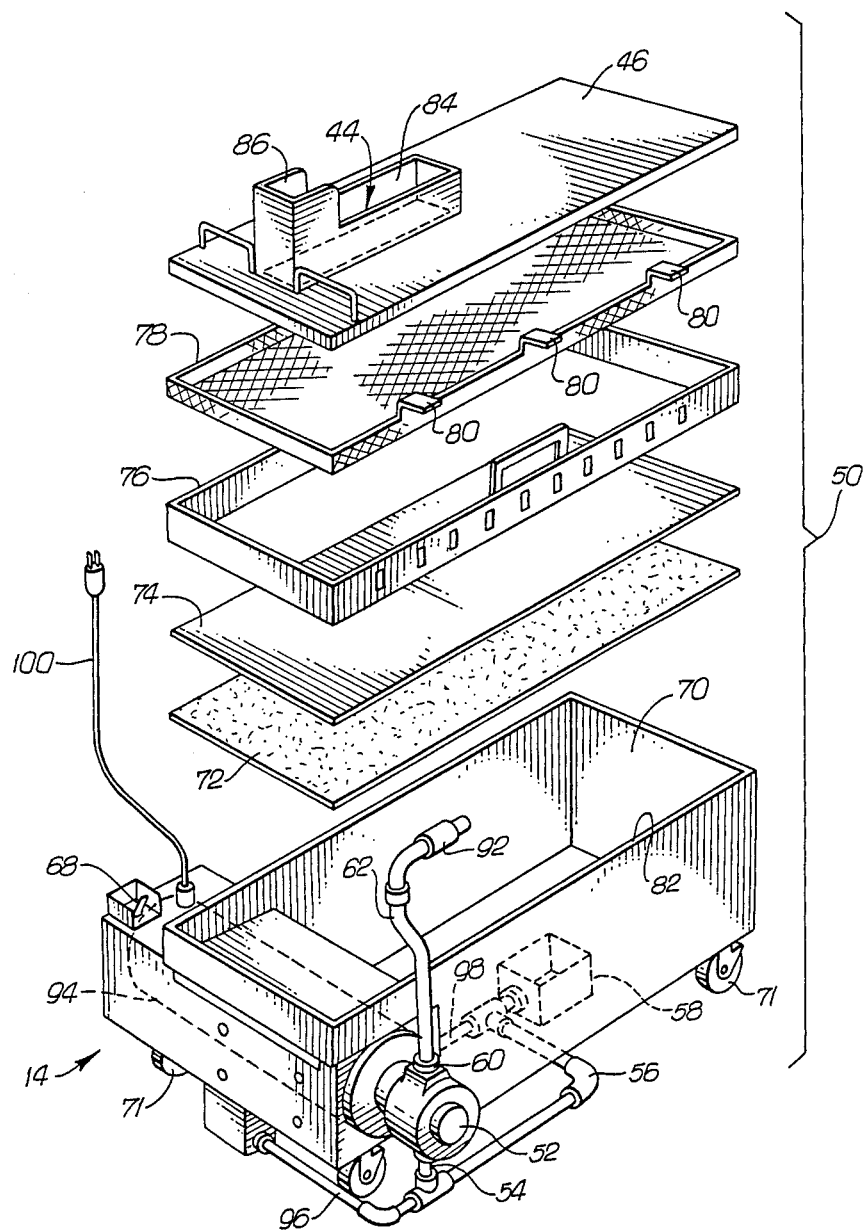

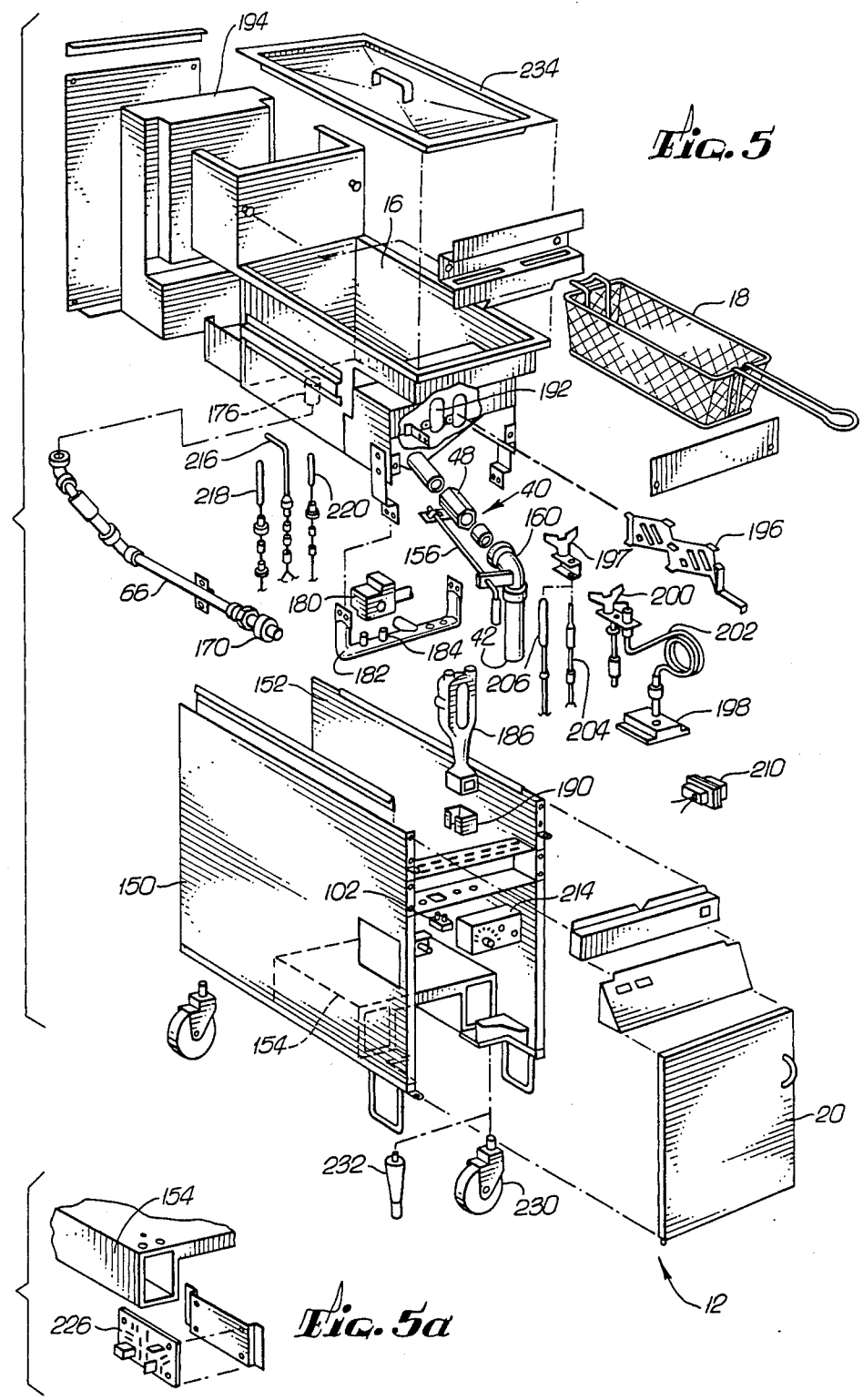

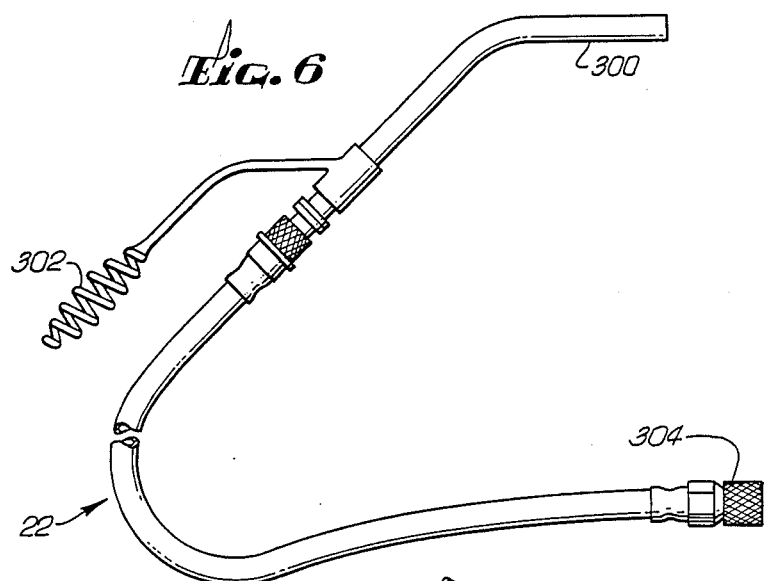
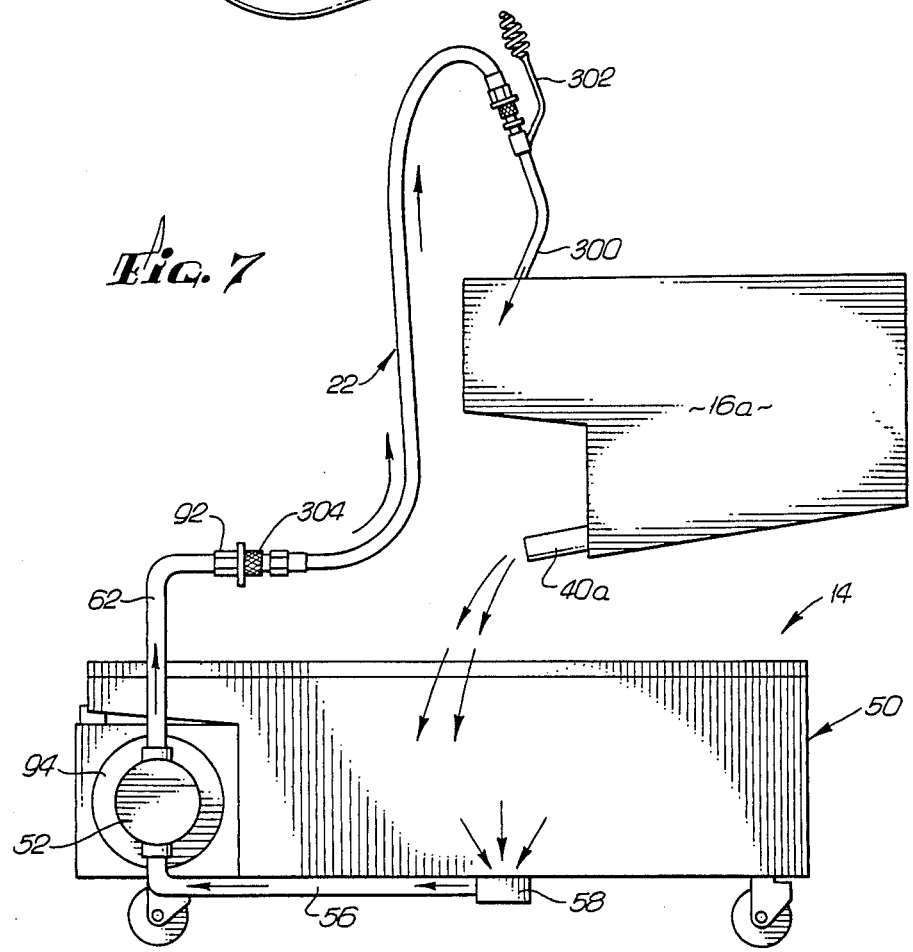

FRYER FILTRATION SYSTEM

BACKGROUND OF THE INVENTION

1. Field of the Invention.

The present invention relates to fryers and more particularly to filtration systems for such fryers.

2. Description of Related Art.

Commercial "deep fat" fryers used in restaurants and other institutions contain several gallons of oil which is heated to a high temperature to fry various foods such as french fries, chicken and fish. Typically, the same oil is used over and over again until it deteriorates to an extent which requires replacement of the oil. Deterioration is caused by contact with the air and the carbonization of food particles retained in the oil. To extend the life of the oil, the oil may be filtered on a regular basis which counteracts the deterioration of the oil.

Two primary types of oil filters used today for deep fat fryers are manual and mechanical filters. In essence, manual oil filters are sophisticated straining devices. They include a mesh netting carried by a wire frame. In use, the oil is removed first from the fryer heating vessel, and is then poured through the manual filter into a larger container, filtering the oil as it passes through the filter. The oil is then manually returned to the fryer from the large container.

In mechanical filters, the oil is transferred (typically by gravity flow) to a vessel containing a filter and the filtered oil is returned to the fryer usually by means of a pump. One advantage of mechanical filters is that the operator's contact with the oil which can be quite hot is minimized. In addition, the oil's contact with the air is also minimized. Still further, mechanical filters are usually faster and more efficient than manual filters.

However, mechanical filters are also typically considerably more expensive than manual filters. In one prior design, a mechanical filter is built into each fryer. In a kitchen having several fryers, the added cost of a mechanical filter for each fryer can be substantial. To reduce the cost of the filters, some prior designs have used a single built-in filter which is shared by more than one fryer. Such systems usually have a number of conduits and valves between the filter and the various fryers, for selectively transporting the oil back and forth between the fryers and the filter. However, in order to minimize the length of such conduits, it is usually necessary to place the fryers side by side and to limit the total number of fryers connected to any one filter.

Another type of mechanical filter, the portable filter, does not impose these limitations. A portable filter, which is usually transported upon a wheeled cart, may be moved from fryer to fryer to filter the oil at each fryer in turn, allowing the servicing of all the fryers in the kitchen regardless of the placement of the fryers. To filter the oil of a particular fryer, the filter is wheeled underneath the vessel of the fryer and the used oil is allowed to drain by gravity flow through a filter into a holding vessel in the portable filter. A pump pumps the filtered oil back to the fryer heating vessel through a flexible hose (typically referred to as a "wand"), the outlet of which is placed into the fryer vessel.

One disadvantage of portable filters is that the use of the flexible hose or wand to return the hot oil to the fryer increases the chance of contact of the hot oil with the operator. In addition, the portable filter can obstruct aisles while it is placed in front of a fryer to perform the filtration operation.

In addition, some portable filters require a separate storage area. In some prior designs, the fryer and portable filter are designed in a manner which allows the portable filter to be stored underneath the fryer. However, because of the external wand, the portable filter typically cannot be enclosed completely within the fryer while the filtration operation is in progress. Moreover, it is often necessary to provide a wall power outlet in the vicinity of each fryer to power the portable filter.

SUMMARY OF THE INVENTION

It is an object of the present invention to provide an improved filter system obviating, for practical purposes, the above mentioned limitations.

These and other objects and advantages are achieved in a filter system for a fryer which, in accordance with a preferred embodiment of the present invention, includes a portable filter which may be connected to a fryer in a "built-in" (or stationary) mode to filter the oil of the fryer internally. Once the filtration process is completed, the filter may be readily disconnected from the fryer, moved to another fryer and reconnected in the stationary mode to filter the oil of that fryer. Alternatively, an external flexible hose or wand may be readily attached to the filter, allowing filtration in a "portable" mode.

BRIEF DESCRIPTION OF DRAWINGS

FIG. 1 is a perspective view of a deep fat fryer and filtration system in accordance with a preferred embodiment of the present invention;

FIG. 2 is a side schematic diagram illustrating the plumbing interconnections of the system of FIG. 1 in a stationary mode of operation;

FIG. 3 is a front schematic diagram illustrating the plumbing interconnections of the system of FIG. 2;

FIG. 4 is an exploded isometric view of the filtration system of FIG. 1;

FIG. 5 is an exploded isometric view of the deep fat fryer system of FIG. 1;

FIG. 5A is a partial view of a bracket of the fryer of FIG. 5;

FIG. 6 illustrates a flexible hose adapted for use with the filter system of FIG. 1; and FIG. 7 is a schematic diagram illustrating the fryer and filtration system of FIG. 1 in a portable mode of operation.

DETAILED DESCRIPTION OF THE DRAWINGS

Referring first to FIG. 1, a deep fat fryer and filter system in accordance with a preferred embodiment of the present invention is illustrated generally at 10. The system 10 includes a deep fat fryer 12 and a removable filter system cart 14 which resides below and within the housing of the fryer 12. The fryer 12 includes an open vessel 16 in which shortening or oil is heated to a high temperature for purposes of frying food. The food to be fried is placed in an open-mesh wire basket such as that illustrated at 18 which is then lowered into the fryer, submersing the food in the hot oil.

As previously mentioned, the oil through repeated use will begin to deteriorate as a result of food particles remaining in the oil after the cooked food is removed. The filter cart 14 removes these particles of food to extend the life of the oil and improve the quality of the taste of the food. As will be explained in greater detail below, the filter cart 14 may be operated in a "stationary" mode wherein the filtration operation is carried out with the filter cart 14 concealed completely below the fryer 12 as illustrated in FIG. 1. Once the filtration operation has been completed, a door 20 of the fryer 12 may be opened, allowing the filter cart 14 to be disconnected and removed from the fryer 12 and moved to another similar fryer. At that fryer, the filter cart 14 can be reinstalled in a manner similar to that illustrated for the fryer 12 and the filtration operation can be repeated for the second fryer. In this manner, the oil of each fryer in the kitchen can be filtered in turn as if each fryer had its own "built-in" filtration system. Consequently, as in a typical built-in system, contact between the hot oil of the fryer as it is being filtered and the operator is minimized for added safety. In addition, the filter cart 14 does not obstruct the aisle in front of the fryer 12. Furthermore, the filter cart 14 can be quickly and easily removed and reinstalled at other fryers eliminating the expense of duplicating the filtration system for each fryer.

In an alternative mode referred to herein as the "portable" mode, the filter cart 14 may be coupled to a flexible hose or "wand" such as that indicated at 22 in FIG. 6. The wand 22 allows the filter cart 14 to be used as an oil disposal system, transporting spent oil from a fryer to a disposal receptacle. In addition, the wand 22 may be used as a filtered oil return hose so that the filtration system 14 may be used to filter the oil of a variety of different fryer configurations as shown schematically in FIG. 7.

FIGS. 2 and 3 are schematic diagrams illustrating the plumbing interconnections between the fryer 12 and the filter cart 14 in the stationary mode. As best seen in FIG. 2, the fryer heating vessel 16 includes a drain pipe 40 having a downwardly extending outlet 42. When the filter cart 14 is placed under the fryer 12, the outlet 42 of the fryer vessel drain pipe 40 is received by an upperly extending inlet 44 of the filter system cover 46. Upon opening of a valve 48, hot oil is allowed to drain out of the fryer vessel 16, through the fryer drain pipe 40 and into a filter pan assembly 50 of the filter cart 14. The filter assembly 50 contains screens and filters for removing food particles and other contaminants from the oil.

To transfer the filtered oil back to the fryer vessel 16, the filter cart 14 further includes a pump 52 having an inlet 54 coupled by a conduit 56 to a sump inlet 58 depending from the bottom of the filter pan assembly 50. Oil passing through the filter pan assembly 50 is collected at the sump inlet 58 and is drawn to the pump 52. A discharge outlet 60 of the pump 52 is coupled by a conduit 62 to a quick connect/disconnect coupler 64. This connect/disconnect can be a simple manual device, but is preferably one such as that manufactured by Snaptite, Model Nos. 23-1C8-8FV and 23-N8-8FV. The coupler 64 couples the pump discharge conduit 62 to one end of a conduit 66, the other end of which is connected to the fryer vessel 16. Thus, after the oil drains from the fryer vessel 16 into the filter pan assembly 50, the oil is filtered and then drawn from the bottom of the pan assembly 50 by the pump 52 and returned back to the fryer vessel 16. Closing the drain valve 48 allows the pump 52 to refill the fryer vessel with the filtered oil.

As shown in FIG. 2, in the stationary mode, the filtration process is conducted entirely within the fryer 12. The door 20 of the fryer 12 can remain closed, except as may be required to operate the drain valve 48 and an on/off switch 68 such that the aisle in front of the fryer 12 is not obstructed. Moreover, the chances of hot oil accidently contacting the operator during the filtration process is correspondingly reduced.

Once the filtration process is completed, the pump return conduit 62 can be disconnected at the coupler 64 from the fryer vessel return conduit 66. The filter cart 14 may be then removed from the fryer 12, rolled to another fryer and reinstalled to internally filter the used oil as shown in FIGS. 2 and 3.

The construction of the filter system cart 14 of the illustrated embodiment is shown in greater detail in FIG. 4. The filter pan assembly 50 of the filter cart 14 includes a generally rectangular holding pan or vessel 70 which is open at the top. The filter pan assembly 50 is mounted on four caster wheels 71 which allows the cart 14 to be easily moved as needed. A filter screen 72 placed in the bottom of the filter vessel 70 supports and spaces a filter paper 74 of similar dimension from the bottom of the filter vessel 70. The filter paper 74 carries a filtering medium such as diatomaceous earth or other powders which, when combined with the paper, forms the primary filter. A retainer ring 76 secures the filter paper 74 in the bottom of the filter vessel 70 atop the filter screen 72. A second screen 78 often referred to as a "crumb catcher" is supported at the top of the filter vessel 70 by a set of protruding tabs 80 which engage the top rim 82 of the filter vessel 70. Covering the filter pan assembly 50 is the lid 46 which defines the filter pan assembly inlet 44. The inlet 44 is surrounded by upstanding vertical walls 84 supported by the lid 46. A raised portion 86 of the upstanding walls 84 receives the downwardly extending outlet 42 of the fryer vessel drain pipe 40 when the filter cart 14 is fully inserted underneath the fryer 12 as shown in FIG. 2. The lid 46 together with the upstanding inlet walls 84 act to prevent back splashing as the hot oil drains into the filter pan assembly 50. In addition, the lid 46 retains some of the heat and vapor of the oil as it filters through the assembly 50.

The hot oil is drawn through the various layers of the filter assembly by the force of gravity in combination with a suction exerted by the pump 52 contained within a pump housing 90 of the filter cart 14. As the oil collects at the bottom of the filter pan 70, the oil is drawn through the sump inlet 58 and the conduit 56 to the pump inlet 54. The pump 52 discharges the oil through an outlet conduit 62 to the male quick disconnect coupler portion 92 of the filter cart 14. The male quick disconnect coupler portion 92 couples to the corresponding female portion 170 of the fryer return conduit 66 (FIG. 2), completing the return line to the fryer vessel 16.

The pump 52 of the illustrated embodiment is a gear oil pump and is powered by an electric motor 94 and energized upon actuation of the on/off switch 68. A power cord 100 of the motor 94 is plugged directly into an internal power outlet 102 of the fryer 12 as shown in FIG. 5. Should the fryer 12 use shortening or other heating oils which solidify at room temperature, the conduit 56 contains heating elements powered through electrical conduits 96 and 98, which prevent clogging of the conduits 54 and 56 and pump 52 as the oil is being filtered. The above described internal power and oil return line couplings allow the filtration process to be performed in a completely "internal" mode eliminating the need for the door 20 of the fryer to remain open during the filtration process and the need for external power outlets.

FIG. 5 shows the construction of the fryer 12 of the illustrated embodiment in greater detail. The fryer 12 includes two generally rectangular vertical upstanding walls 150 and 152 which are secured in a spaced relationship by a generally U-shaped bracket 154. The bracket 154 is formed from sheet metal which is folded and welded to assume the "upside-down" U-shape illustrated in FIG. 5. The U-shape of the bracket 154 provides clearance to allow the filter cart 14 to be inserted underneath the fryer 12 as shown in FIG. 3. The U-shaped bracket 154 also, when combined with other elements of the fryer including the walls 150 and 152, forms the structural frame of the fryer. Addition of the door and back generally form the fryer housing.

The drain pipe 40 of the vessel 16 includes a valve 48 which is actuated by a push rod 156 which extends to the front of the fryer 12. An elbow 160 couples the valve 48 to the outlet 42 of the drain pipe 40. Thus, when the filter cart 14 is inserted underneath the fryer 12 with the outlet 42 of the drain pipe 40 received within the inlet 44 of the filter pan assembly 50 (FIG. 2), the valve 48 is opened allowing the oil to drain into the filter cart 14.

Once all the oil has drained from the vessel 16, the valve 48 can be closed while the filtered oil is pumped back into the vessel 16 through the return conduit 66. The return conduit 66 includes the female half 170 of the quick disconnect coupler 64 (FIG. 2) which couples with the male quick disconnect coupler portion 92 (FIG. 4) of the discharge conduit 62 of the filter cart 14. The other end of the return conduit 66 is coupled to an oil return orifice 176 at the back of the vessel 16.

Gas is admitted to the fryer through a gas valve 180 which controls the flow of gas to a manifold 182. The manifold 182 has a plurality of orifices 184 which each inject gas vertically into a burner, an example of each is indicated at 186. The burner 186 mixes the gas with air, the amount of which is controlled by an air shutter 190. The mixture of air and gas is ignited such that the flame resides on the back side of each burner 186. The flame of each burner is injected into an associated tube 192 defined by the underside of the vessel 16. The combustion of the air and gas mixture continues as the mixture flows through the tubes 192 which are connected at the other end to a common collector box or flue assembly 194. Within each combustion tube 192 is a diffuser 196 which slows the flow of the air and gas mixture.

To ignite the air and gas mixture, the fryer 12 includes a pilot 197 and an electronic spark module 198 having an ignition sensor 200 coupled by an ignition sensor cable 202. A thermopile 204 or a thermocouple 206 provides a safety interlock for the pilot 197. A transformer 210 steps down the voltage to a level appropriate for the control devices.

The cooking temperature of the oil is set at a temperature control panel 214. The temperature of the oil is sensed by an operating thermostat sensor 216 or 218. The high temperature limit sensor 220 is used to shut the fryer down should an unsafe operating temperature be approached. A temperature controller 226 is mounted within the bracket 154 as shown in FIG. 5A.

The fryer 12 is selectively mounted either upon castor wheels 230 or fixed legs 232, depending upon the requirements of the installation. A lid 234 is provided to cover the vessel 16 when the fryer 12 is not in use.

As previously mentioned, the filter cart 14 of the present invention may also be used in a portable mode in which it is disconnected from the fryer 12. FIG. 7 illustrates the portable mode in greater detail. As shown therein, the pump discharge conduit 62 of the filter cart 14 is connected to the wand 22 of FIG. 7 rather than the vessel return line 66 of the fryer 12. The wand 22 is a flexible hose having a nozzle 300 which may be inserted directly into the fryer vessel 16a through the open top of the vessel. In this manner, the filter cart 14 can be used with a variety of different fryer types which may not have a built-in vessel return line such as that indicated at 66 in FIG. 2. The wand 22 also has a handle 302 which allows the wand to be more safely handled. To facilitate the coupling and uncoupling of the wand 22 with the pump discharge conduit 62, the wand 22 has a female quick connect/disconnect coupler portion 304 which is adapted to readily connect and disconnect with the male quick connect/disconnect coupler portion 92 (FIG. 4) of the filter cart 14.

The soiled oil may be drained from any fryer vessel such as 16a through a vessel drain pipe 40a in a manner similar to that described above for the stationary mode or may drain into the filter cart 14 with the filter cart lid 46 removed as shown in FIG. 7. Should the oil of the fryer 12 need replacing, the filter cart 14 can be used to transport the spent oil to a disposal receptacle and the oil may be pumped into the disposal receptacle through the wand 22.

It is seen from the above that the present invention provides a highly versatile filtration system for deep fat fryers, which may be used in a stationary mode in which the filter functions in a manner similar to that of built-in filters. However, the filter can be readily disconnected from a particular fryer and reconnected to another fryer to function again in the stationary mode. Alternatively, a wand can be attached to the filter wherein the filtration system can be operated as a portable system.

It will, of course, be understood that the modifications of the present invention, in its various aspects, will be apparent to those skilled in the art, some being apparent only after study and others being manners of routine mechanical design. For example, plumbing can be installed in a number of fryers so that a filtration system in accordance with the present invention can be used to filter each of the fryers without moving the filter cart. Other embodiments are also possible, their specific designs depending upon the particular application. As such, the scope of the invention should not be limited by the particular embodiment herein described but should be defined only by the appended claims and equivalents thereof.

What is claimed is:

1. A fryer having a vessel for heating oil, a frame for supporting the vessel and a housing for enclosing the frame;

a low profile cart adapted to be removably-received within the fryer frame and housing and underneath the fryer vessel, the cart having a vessel for receiving oil from the fryer vessel, a filter for filtering oil from the fryer vessel and a pump for pumping oil from the cart vessel back to the fryer vessel;

wherein said fryer vessel has an oil return orifice and said fryer has a return conduit internal to the housing coupled to the fryer vessel orifice and wherein said pump has a discharge outlet and the cart has a discharge conduit coupled to the pump outlet;

wherein said system further comprises means for selectively coupling the fryer return conduit and the cart discharge conduit together so that filtered oil may be pumped from the cart vessel to the fryer vessel internally via the cart discharge conduit and the fryer return conduit when the fryer return conduit and cart discharge conduit are coupled together; and;

wherein the frame of the fryer includes two upstanding wall portions and an inverted U-shaped bracket joining the two wall portions, the center of the bracket providing sufficient clearance to allow the filter cart to pass under the bracket.

2. A fryer and filter system comprising:

a fryer oil vessel for heating oil;

a frame supporting the fryer oil vessel, the frame having two upstanding frame panels and a bracket joining the lower portions of the frame panels below the fryer oil vessel so as to support the upstanding panels in the upstanding position;

a low profile filter unit adapted to be removably received within the space immediately below the center of the bracket, the filter unit having an oil reservoir for receiving oil from the filter oil vessel, a filter for filtering oil from the fryer oil vessel and a pump for pumping oil from the filter oil reservoir back to the fryer oil vessel;

oil flow conduit coupling the output of the pump to the fryer oil vessel; and means for selectively coupling the oil flow conduit so that filtered oil may be pumped from the filter unit to the fryer oil vessel internally within the housing via the oil flow conduit.

3. A system as in claim 2 wherein the fryer oil vessel is supported along the top portions of the two frame panels and the bracket provides lateral support to maintain the panels in an upstanding position.

4. A system as in claim 3 wherein the bracket is an inverted U-shaped bracket joining the panels adjacent the lower edges of the panels wherein the center of the bracket provides sufficient clearance to allow the filter unit to freely pass under the bracket.

5. A system as in claim 4 wherein the pump is installed on the filter unit in a position at or below the height of the filter oil reservoir.

6. A system as in claim 2 wherein the bracket is formed from folded and welded sheet metal.

* * * * *